3,637,556
SEALING COMPOSITION CONTAINING A GELLED POLYBUTENE OIL PLASTICIZER
James H. Brillinger, Westfield, N.J., assignor to W. R. Grace & Co., Cambridge, Mass.
No Drawing. Continuation-in-part of application Ser. No. 537,321, Mar. 25, 1966. This application July 9, 1969, Ser. No. 840,486
Int. Cl. C08d 9/08
U.S. Cl. 260—23.7                                           11 Claims

ABSTRACT OF THE DISCLOSURE

A sealing composition particularly suited for caulking joints, cracks, etc., contains butyl or halogenated butyl rubber, a solvent for the rubber and a polybutene oil gelled with, e.g., aluminum stearate as a plasticizer. The composition can additionally contain a drying oil and fillers.

---

This application is a continuation-in-part application of application Ser. No. 537,321, filed Mar. 25, 1966, now abandoned.

This application is directed to novel sealing compositions and more particularly to butyl or halogenated butyl, rubber caulks.

Compositions employing butyl or halogenated butyl rubber, plasticizers and fillers have been found to be particularly useful as caulks, that is, for the sealing of non-working construction joints. However, such caulking compositions suffer from certain deficiencies, primarily non-uniform and incomplete wetting of the fillers by the oils employed as plasticizers which results in poor "sag" (the tendency of a material to flow in a vertical joint), and poor viscosity stability. After packaging, there is an increase in viscosity, making the product difficult to extrude. Materials which are added to promote wetting of the fillers also result in a marked viscosity increase and require a decrease in the amount of filler in the compositions. In the past, sag has been controlled by the addition of fibrous material such as asbestos. However, the additional fibrous material necessary to prevent sag increases the viscosity of the caulk to a degree that renders extrusion from the caulking gun extremely difficult.

A novel caulk has now been found which does not suffer from the deficiencies of the prior art.

The novel caulk of the present invention comprises butyl or halogenated butyl rubber, and, as a plasticizer, polybutene oil which has been gelled with a metallic salt of fatty acid. The employment of the greaselike polybutene gel, in addition to plasticizing the rubber, unexpectedly promotes uniform mixing of the components and wetting of the fillers, and drastically reduces the tendency of the caulk to sag while at the same time providing viscosity stability, and improving the extrudability of the caulk. The plasticitzer which normally contributes to sag is rendered thixotropic and the reduced mobility results in uniform wetting of the filler which does not change with the passage of time. The employment of the metallic salt of a fatty acid and polybutene oil in a composition will not provide the aforementioned advantageous results unless the polybutene oil is gelled by the metallic salt of a fatty acid.

The polybutene oils employed in the present invention are commercially available. The particular polybutene oil employed should have an average molecular weight of less than 850, and preferably 500 to 520.

The preferred metallic salts of fatty acids are $C_{16}$ and $C_{18}$ fatty acid salts and include aluminum stearate, aluminum palmitate and lithium stearate. Other metals and fatty acids also function satisfactorily. In a particularly preferred embodiment, aluminum stearate is employed. Although lesser amounts can be employed, preferably at least 5 percent by weight of a metallic salt of a fatty acid based on the polybutene oil is employed. More preferably 10 percent of the metallic salt of a fatty acid is employed. The upper limit of the metallic salt of a fatty acid is determined by the particular degree of gel desired. The selection of the particular gelling agent and polybutene oil is limited only by the common solubility of the two materials.

Preparation of the polybutene gel is accomplished by adding the metallic salt of the fatty acid to polybutene oil at room temperature in a vessel equipped with an agitator. After uniformly dispersing the gelling agent, uniform heating of the vessel is begun while the materials are mixed. The temperature is slowly raised until a complete solution of the gelling agent is achieved. The particular temperature at which complete solution occurs is determined by the particular metallic salt of the fatty acid; for example, in the case of aluminum stearate, complete solution can occur as low as 200° F.; however, in order to achieve solution in a relatively short time, the materials can be raised to about 320° F. In the case of lithium stearate, a temperature of about 400° F. is preferably employed. The gel is then cooled slowly and is mixed with the other components of the caulk.

The rubber component of the composition of the invention is generally employed in an amount of about 2 to 25, preferably about 5 to 15, percent by weight, based on the total weight of the composition. Both butyl rubber, and halogenated butyl rubber, which usually contains about 1 to 1.5 weight percent of combined fluorine, chlorine or bromine, based on the weight of the polymer, are generally employed in caulks in an organic solvent solution, preferably a solution in mineral spirits. The amount of solvent for the rubber used in caulking composition of the type of the invention will vary but usually does not exceed about 25, preferably 15 percent by weight, based on the total weight of the composition.

In addition to the polybutene oil and solvent, a drying oil is also employed if desired. As examples of suitable drying oils, mention may be made of naturally occurring oils such as linseed oil, soybean oil, tung oil, perilla, cottonseed oil, corn oil, sunflower oil, and the like. The amount of drying oil used should range between about 1 to 20, preferably 2 to 10, percent by weight of the total composition.

Fillers which may be employed in the caulks in an amount ranging generally between 1 and 70 percent by weight of the composition include, but are not limited to, extenders such as calcium carbonate, talc, clays, and asbestos. Pigments, e.g., titanium dioxide, carbon black, and iron oxides, and preservatives are also usually employed.

The following nonlimiting examples illustrate the novel compositions of the present invention. Example I shows a novel caulk within the scope of the present invention wherein polybutene oil has been gelled with aluminum stearate. For comparative purposes, a control composition was also prepared containing the same ingredients but wherein the polybutene oil was not gelled.

| | Example I (parts by weight) | Control (parts by weight) |
|---|---|---|
| Linseed oil | 67.0 | 67.0 |
| Chlorinated butyl rubber containing about 1.2 weight percent chlorine (50% solution in mineral spirits) | 246.0 | 246.0 |
| Polybutene oil (average molecular weight 500 to 520) | [1] 191.2 | 191.2 |
| Aluminum stearate | [1] 21.2 | 21.2 |
| Titanium dioxide | 160.0 | 160.0 |
| Calcium carbonate | 450.0 | 450.0 |
| Talc | 200.0 | 200.0 |

[1] Gelled.

The above compositions were then evaluated under Federal Specification TT-C-598b Tests for sag and extrudability (60 p.s.i.) using a Bureau of Standards designed extruder.

| | Example I | Control |
|---|---|---|
| Sag, inch | 0.09 | 0.73 |
| Extrudability, grams per minute | 24.7 | 25.3 |

From the above table, it can be seen that for comparable extrudabiliy, the sag of the ungelled composition is eight times greater than the gelled composition.

EXAMPLE II

A composition containing gelled polybutene oil is prepared as in Example I, except that butyl rubber having an average molecular weight before depolymerization of about 350,000 is employed in place of the chlorinated butyl rubber component.

I claim:

1. A caulking composition comprising about 2 to 25 weight percent of butyl rubber or halogenated butyl rubber containing about 1 to 1.5 wt. percent halogen, up to about 25 weight percent of a solvent for said rubber and about 5 to 40 weight percent polybutene oil which has been gelled with a metallic salt of a fatty acid prior to incorporation in said composition, said amounts of rubber, solvent and oil being based on the weight of the total composition.

2. The composition of claim 1 wherein the amount of said metallic salt is at least 5 weight percent based on the weight of said polybutene oil.

3. The composition of claim 1 wherein said rubber is chlorinated butyl rubber.

4. The composition of claim 1 wherein said metallic salt is aluminum stearate.

5. The composition of claim 1 additionally containing a naturally occurring drying oil in an amount of about 1 to 20 weight percent.

6. The composition of claim 1 additionally containing a filler in an amount of about up to about 70 weight percent.

7. The composition of claim 1 wherein said polybutene oil has an average molecular weight of less than 850 prior to gellation.

8. A caulking composition comprising about 5 to 15 weight percent of butyl rubber or halogenated butyl rubber containing about 1 to 1.5 weight percent of combined halogen based on the weight of said halogenated butyl rubber, from about 1 up to about 15 weight percent of a solvent for said rubber, about 10 to 20 weight percent of polybutene oil which has been gelled with at least 5 weight percent, based on the weight of said oil, of a metallic salt of a fatty acid prior to incorporation in said composition, about 2 to 10 weight percent of a naturally occurring drying oil and about 1 to 70 weight percent of a filler, the amounts of said rubber, solvent, gelled polybutene oil, drying oil and filler being based upon the total weight of the composition.

9. The composition of claim 8 wherein said rubber is chlorinated butyl rubber.

10. The composition of claim 8 wherein said drying oil is linseed oil.

11. The composition of claim 8 wherein said filler is a mixture of calcium carbonate and talc.

References Cited

UNITED STATES PATENTS

| 3,320,333 | 5/1967 | Battline | 260—846 |
| 3,400,090 | 9/1968 | Maslow | 260—23.7 |

DONALD E. CZAJA, Primary Examiner

D. J. BARRACK, Assistant Examiner

U.S. Cl. X.R.

260—23.7 B, 23.7 M, 33.6 AQ, 41.5 R